(12) United States Patent
Malleck et al.

(10) Patent No.: US 8,064,701 B2
(45) Date of Patent: Nov. 22, 2011

(54) OPTICAL CHARACTER READERS FOR READING CHARACTERS PRINTED ON WIRES OR WIRE SLEEVES

(75) Inventors: Richard A. Malleck, Granbury, TX (US); Phillip McNutt, Austin, TX (US); Charles E. Ince, III, Ft. Worth, TX (US); Steven T. Bader, Ft. Worth, TX (US); Michael C. Dauwalder, Ft. Worth, TX (US); James A. Kelley, Benbrook, TX (US); Jimmy W. Lynam, Ft. Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 909 days.

(21) Appl. No.: 12/056,636

(22) Filed: Mar. 27, 2008

(65) Prior Publication Data

US 2009/0245644 A1    Oct. 1, 2009

(51) Int. Cl.
    *G06K 9/18*    (2006.01)

(52) U.S. Cl. ........ 382/182; 382/195; 382/218; 382/162; 428/402

(58) Field of Classification Search .................. 382/118, 382/195, 218, 162; 428/402
See application file for complete search history.

(56) References Cited

U.S. PATENT DOCUMENTS

| | | | |
|---|---|---|---|
| 4,587,407 A | 5/1986 | Ahmed et al. | |
| 5,127,602 A | 7/1992 | Batey et al. | |
| 5,704,189 A | 1/1998 | Collier | |
| 6,510,984 B2 | 1/2003 | Blankenship et al. | |
| 6,590,659 B2 * | 7/2003 | Melnyk et al. | 356/406 |
| 6,793,401 B2 | 9/2004 | Daniel | |
| 7,093,351 B2 | 8/2006 | Kelley et al. | |
| 2005/0235491 A1 * | 10/2005 | Macnutt et al. | 29/868 |
| 2006/0118323 A1 | 6/2006 | Kalisz et al. | |

* cited by examiner

*Primary Examiner* — Mike Rahmjoo
(74) *Attorney, Agent, or Firm* — Bracewell & Giuliani LLP

(57) ABSTRACT

A scanning system for scanning a wire to determine the characters provided on the wire.

12 Claims, 23 Drawing Sheets

US 8,064,701 B2

OPTICAL CHARACTER READERS FOR READING CHARACTERS PRINTED ON WIRES OR WIRE SLEEVES

1. CROSS-REFERENCE TO RELATED APPLICATIONS

The present application is related to U.S. patent application Ser. No. 12/056,722, filed on Mar. 27, 2008, the disclosure of which is incorporated herein by reference.

2. BACKGROUND

This disclosure relates to image processing systems.

DETAILED DESCRIPTION

Figure 1:
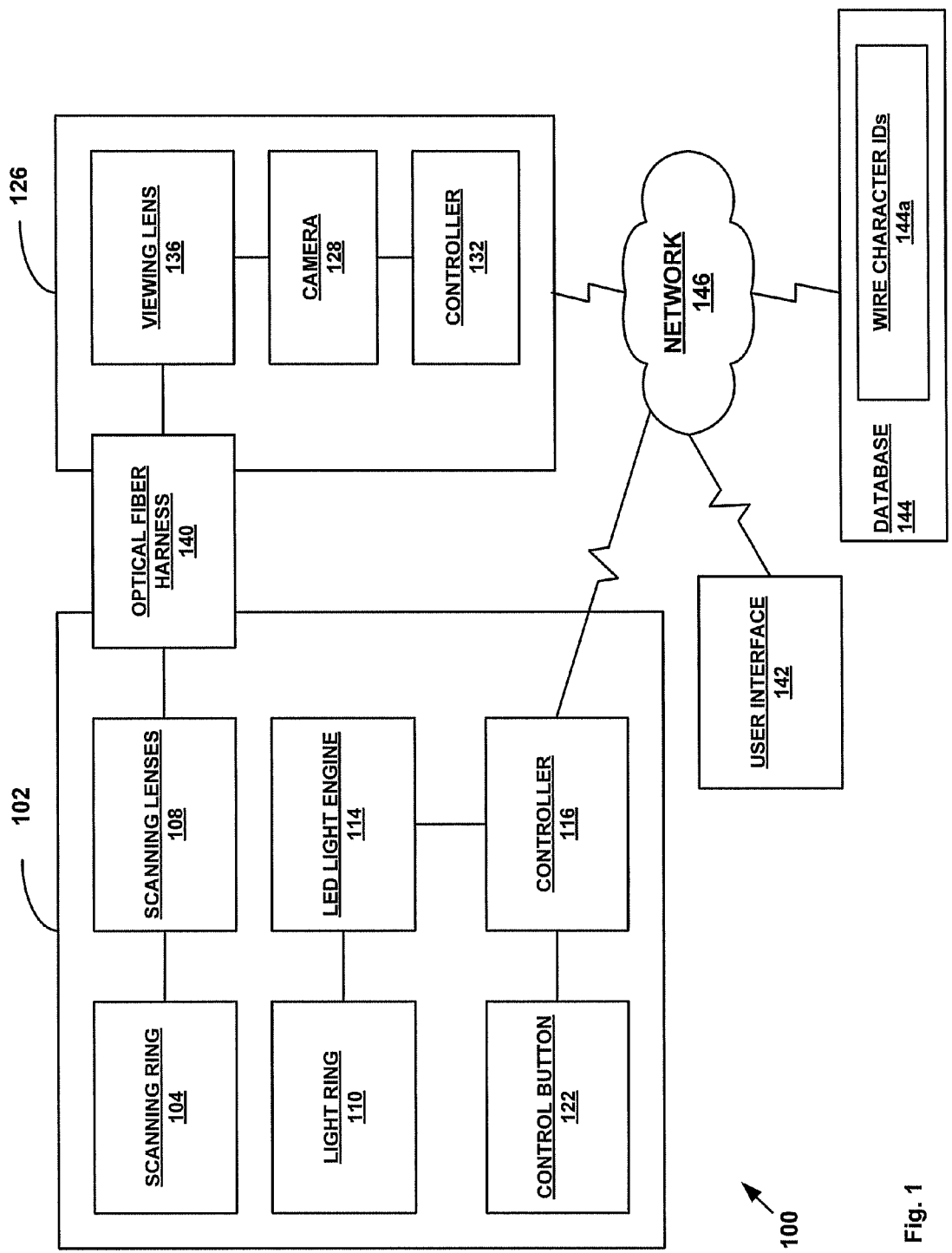
FIG. 1 is a schematic illustration of an exemplary embodiment of a system for reading characters printed on wires.
Figure 2:
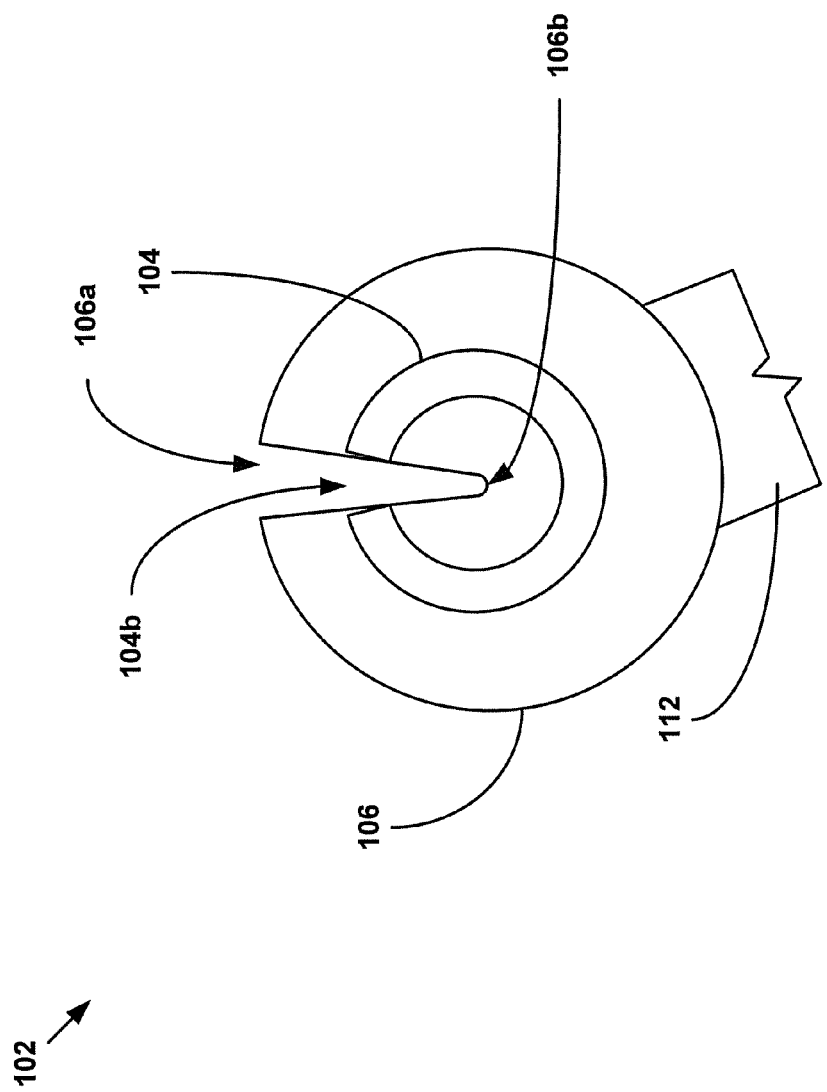
FIG. 2 is a top view of a portion of the optical scanning tool of the system of FIG. 1.
Figure 3:
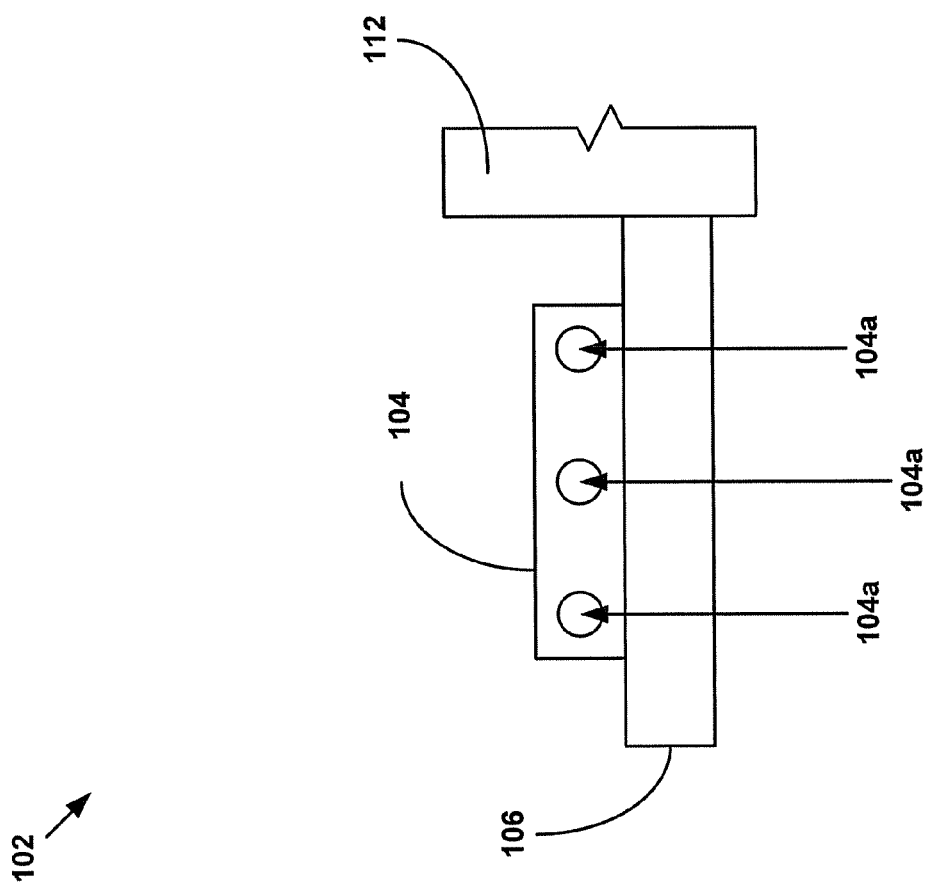
FIG. 3 is a side view of a portion of the optical scanning tool of FIG. 2.
Figure 4:
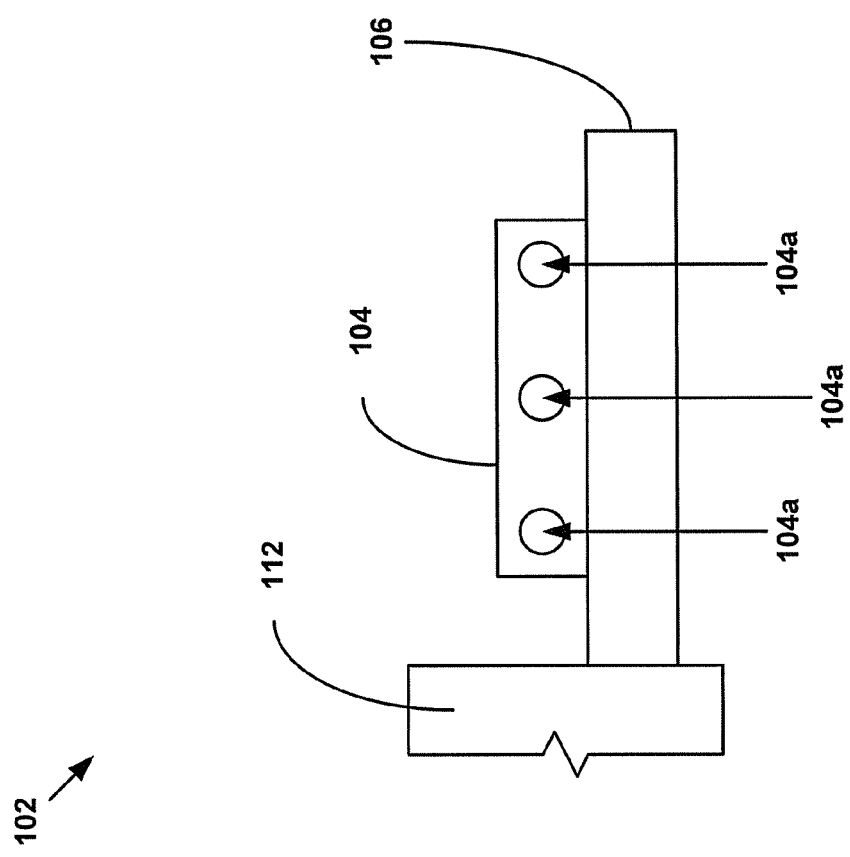
FIG. 4 is another side view of a portion of the optical scanning tool of FIG. 2.
Figure 5:
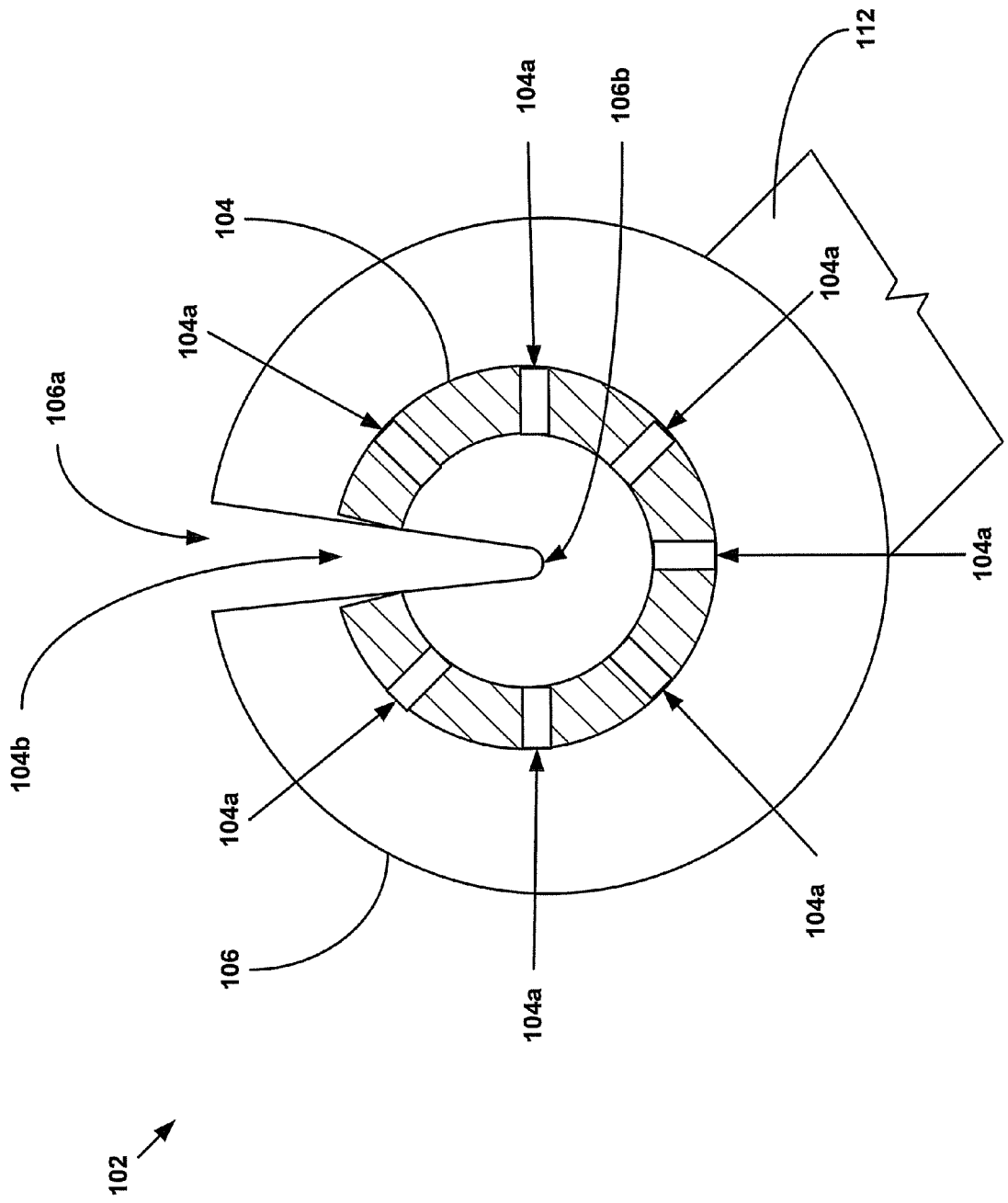
FIG. 5 is a fragmentary cross sectional top view of a portion of the optical scanning tool of the system of FIG. 1.
Figure 6:
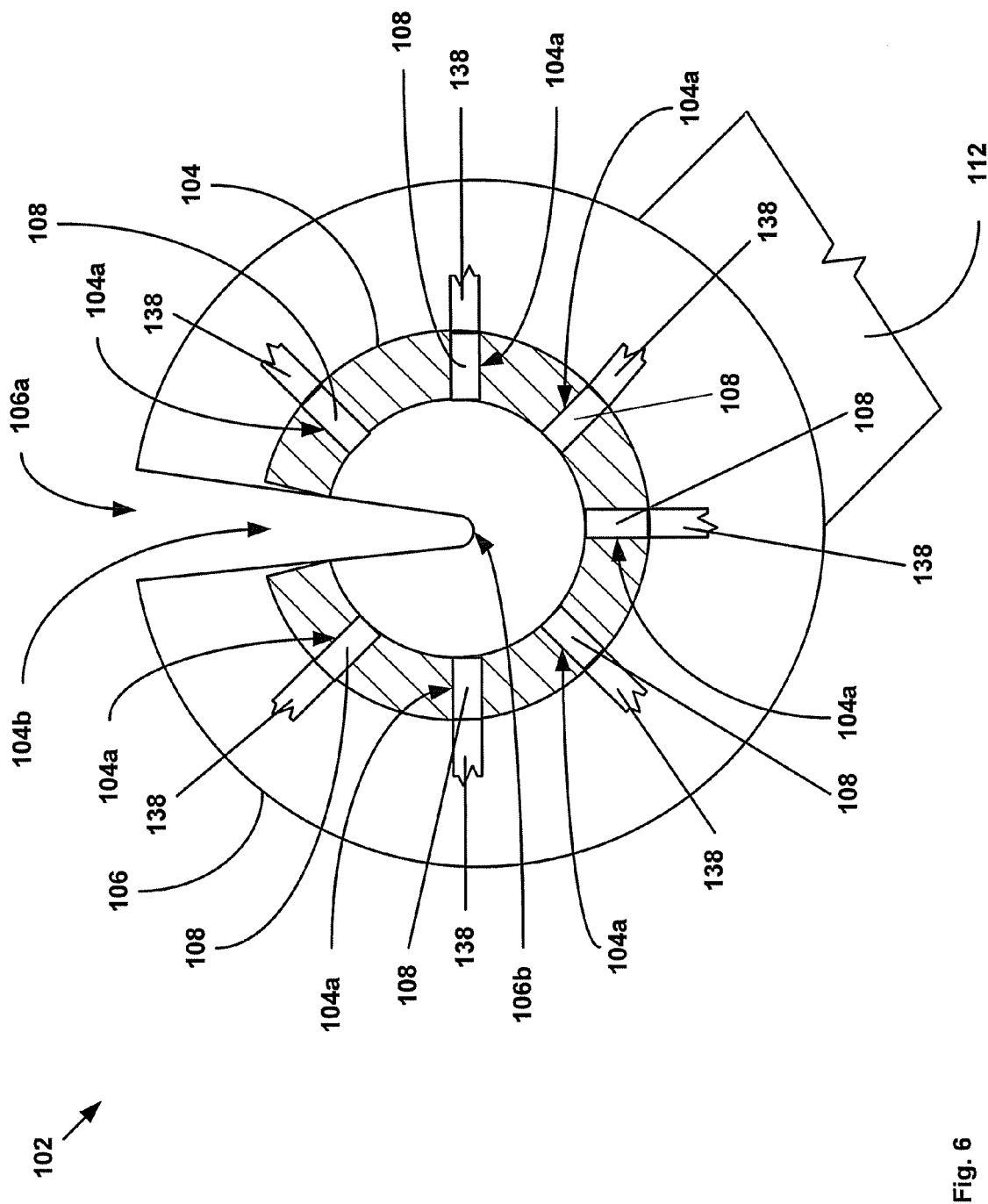
FIG. 6 is a fragmentary cross sectional top view of a portion of the optical scanning tool of the system of FIG. 1.
Figure 7:
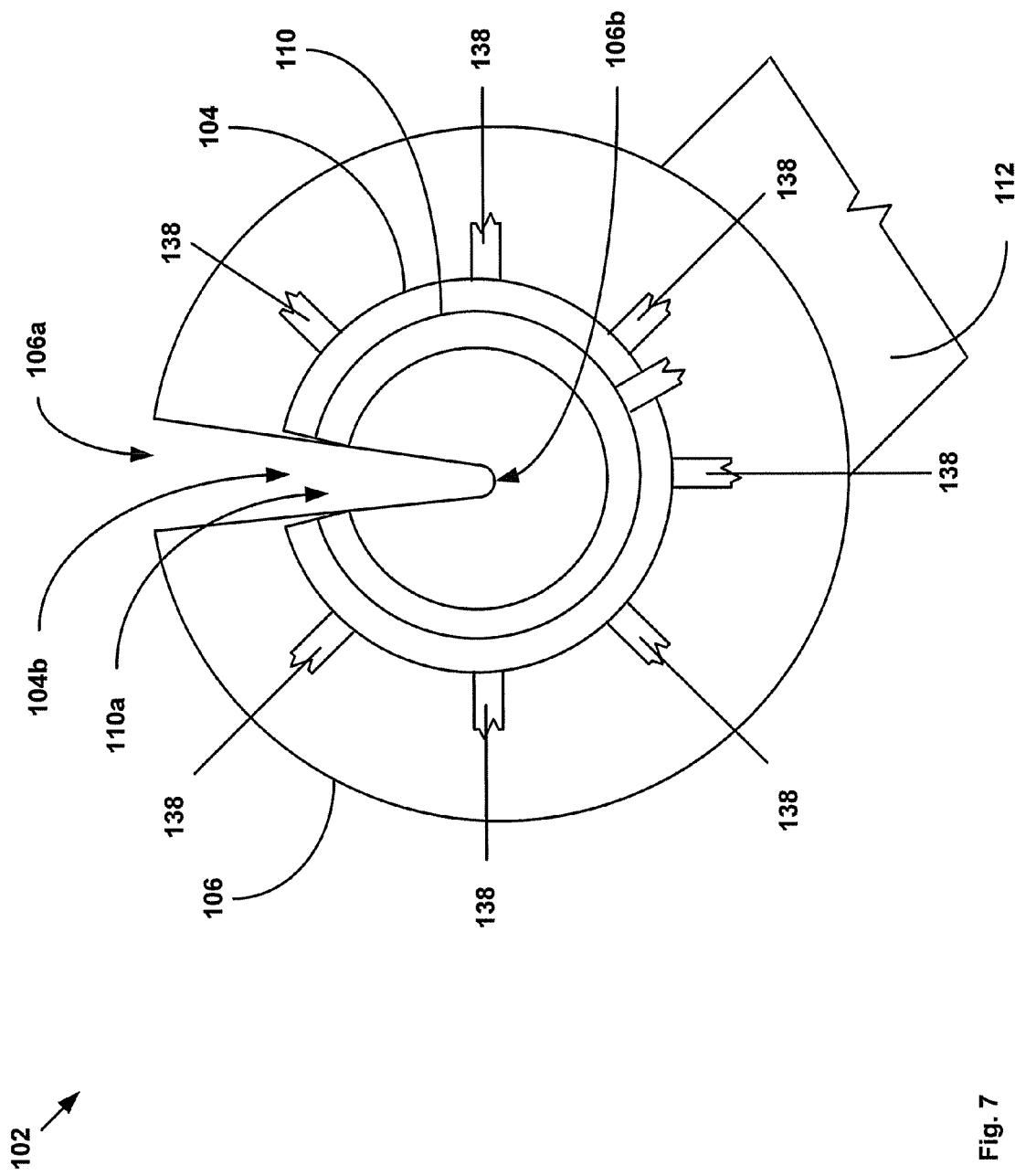
FIG. 7 is a fragmentary cross sectional top view of a portion of the optical scanning tool of the system of FIG. 1.
Figure 8:
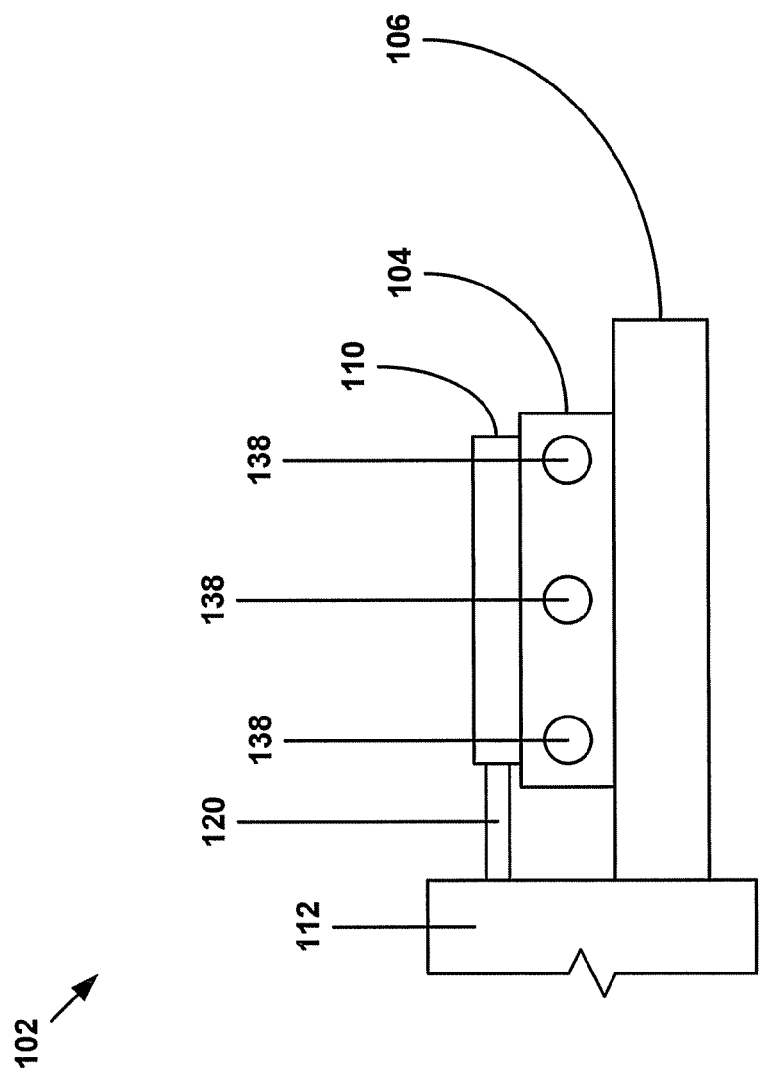
FIG. 8 is a fragmentary cross sectional top view of a portion of the optical scanning tool of the system of FIG. 1.
Figure 9:
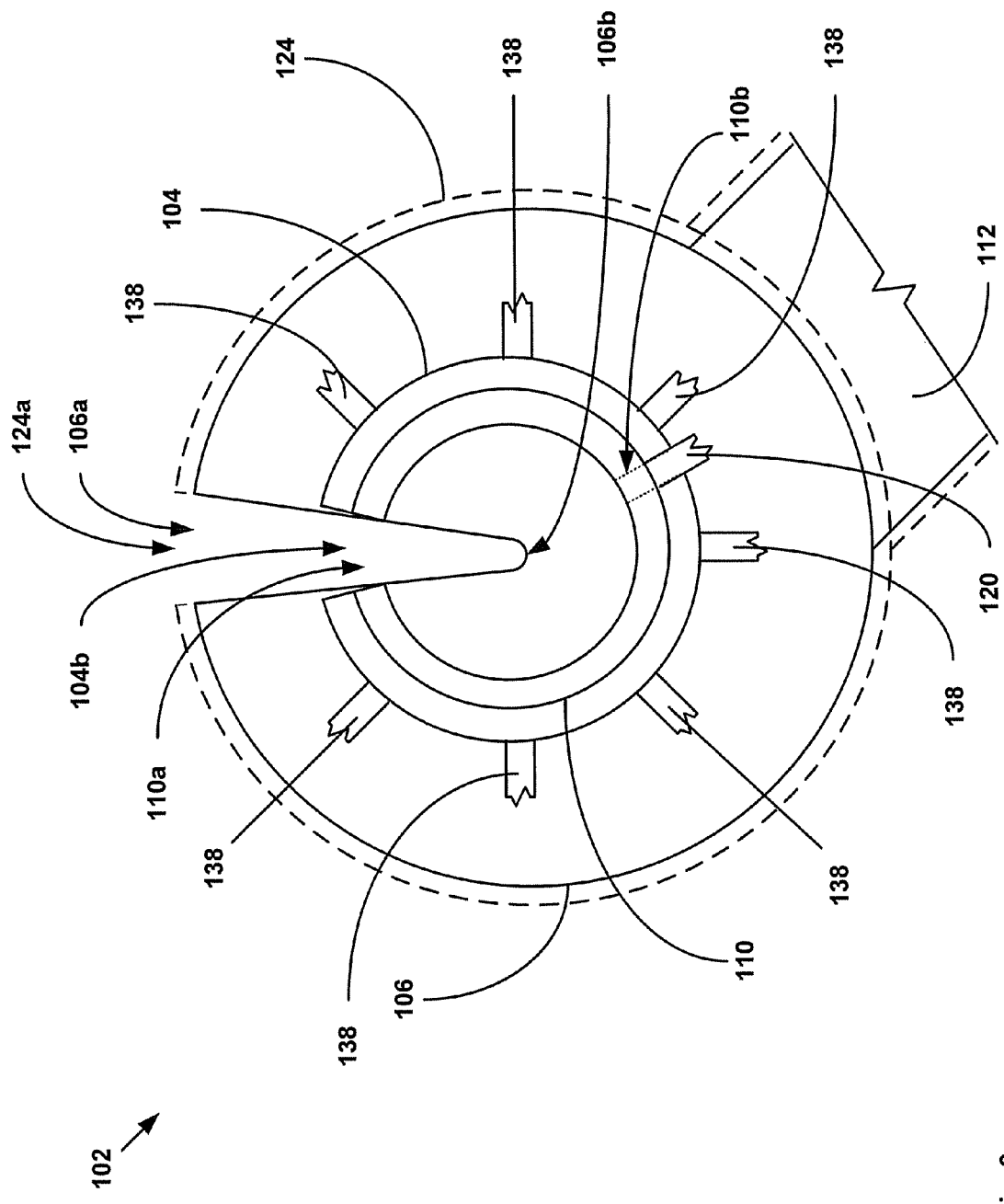
FIG. 9 is a fragmentary cross sectional top view of a portion of the optical scanning tool of the system of FIG. 1.
Figure 10:
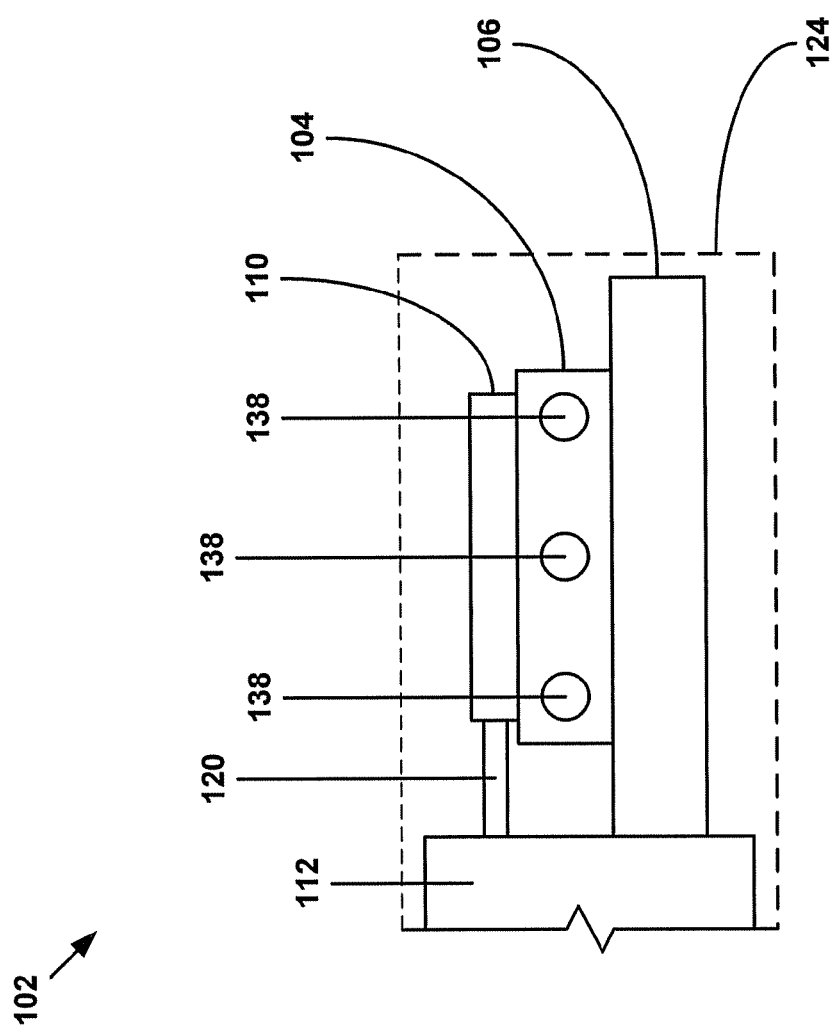
FIG. 10 is a fragmentary cross sectional side view of a portion of the optical scanning tool of the system of FIG. 1.
Figure 11:
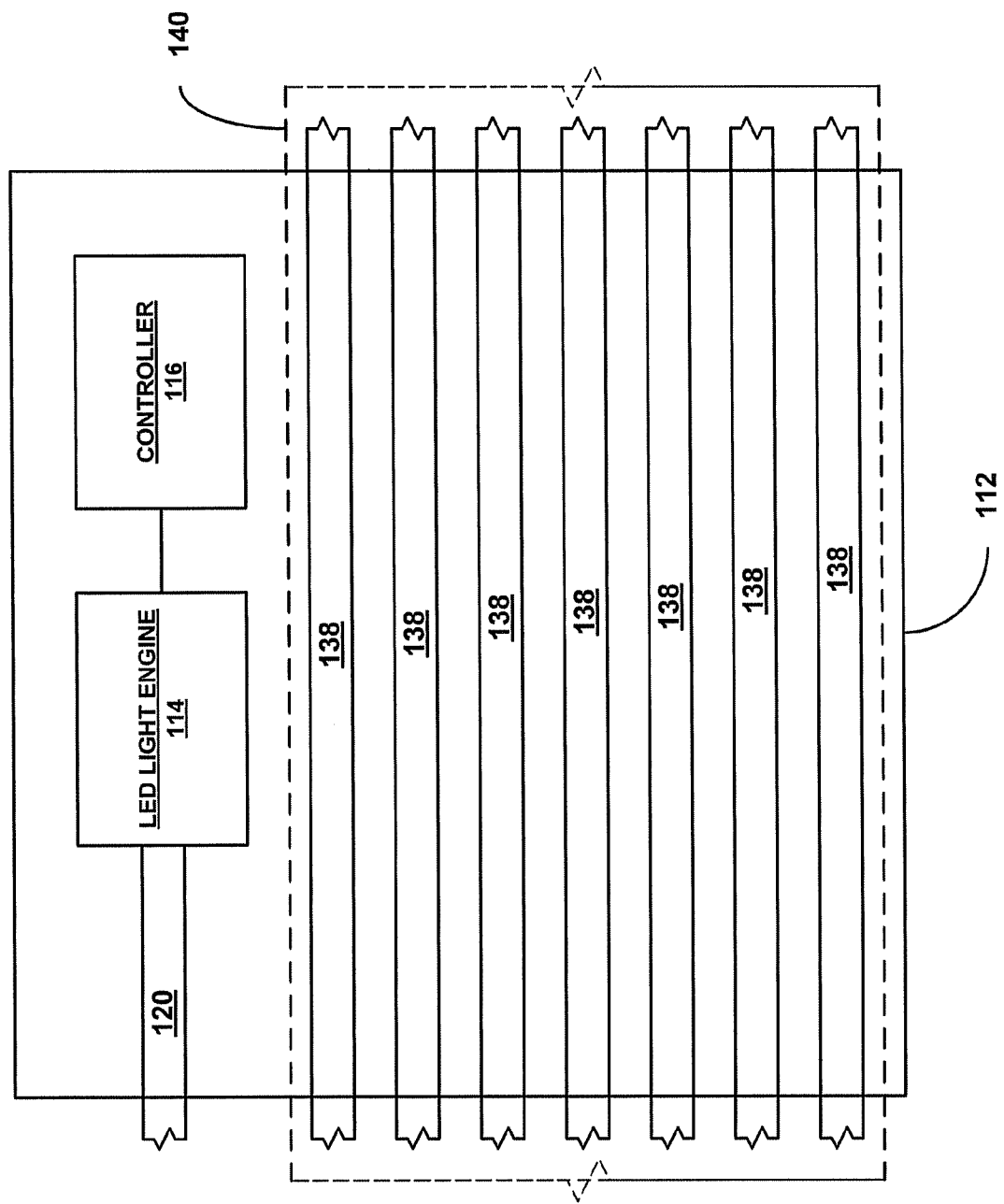
FIG. 11 is a fragmentary schematic view of a portion of the optical scanning tool of the system of FIG. 1.
Figure 12:
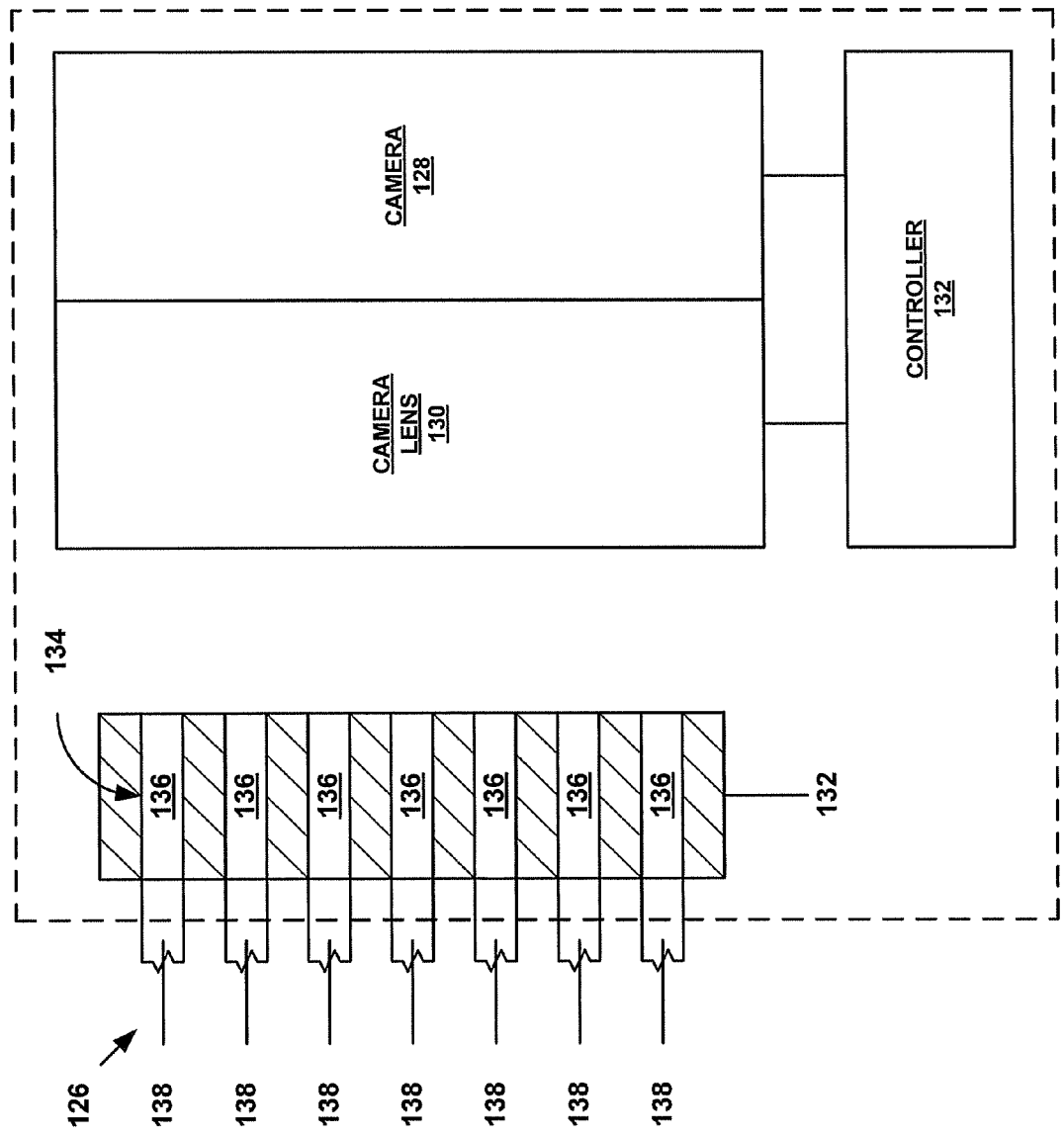
FIG. 12 is a fragmentary cross sectional and top schematic view of the camera scanning and image processing assembly of the system of FIG. 1.
Figure 13:
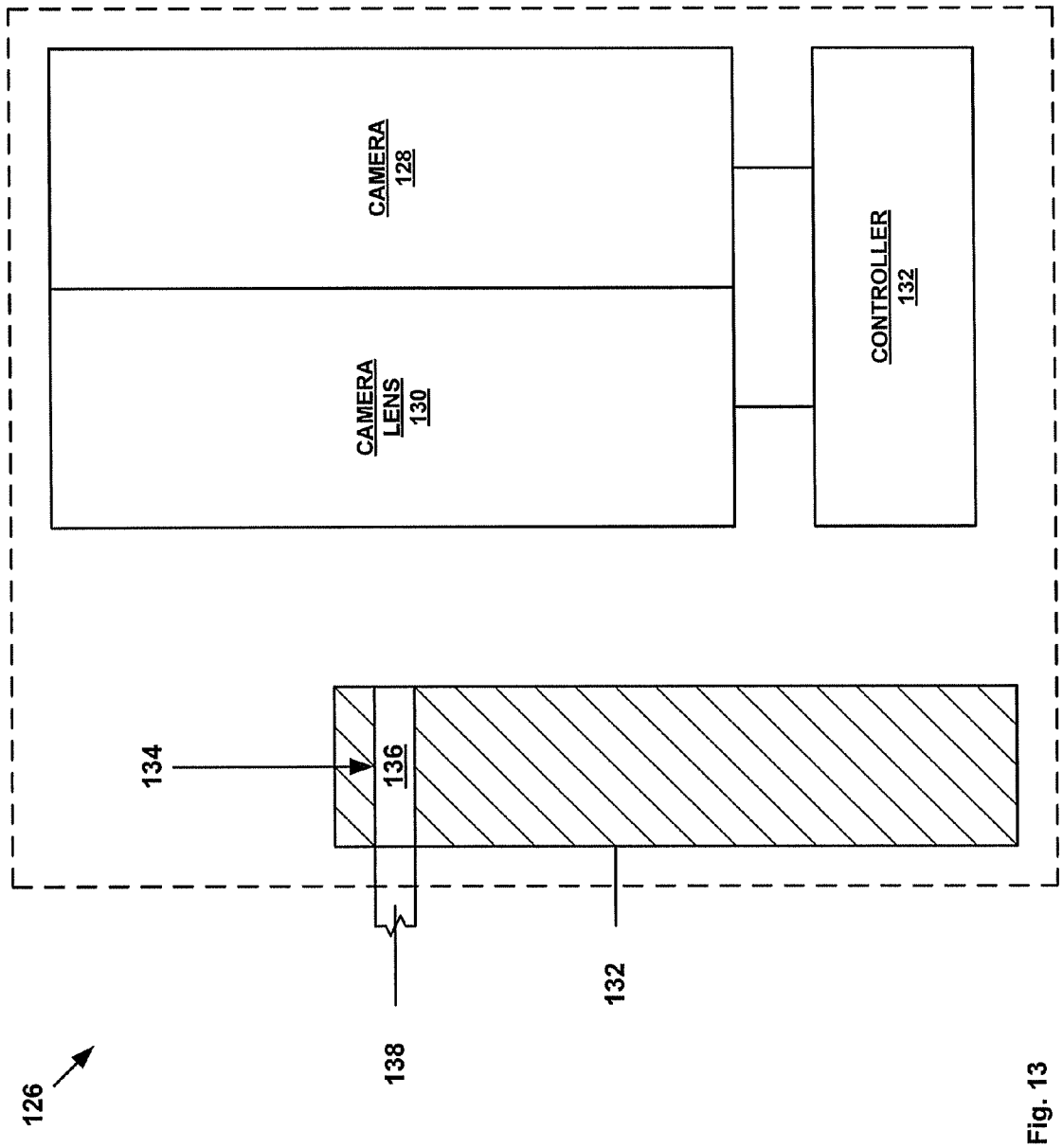
FIG. 13 is a fragmentary cross sectional and top schematic view of the camera scanning and image processing assembly of the system of FIG. 1.
Figure 14A:
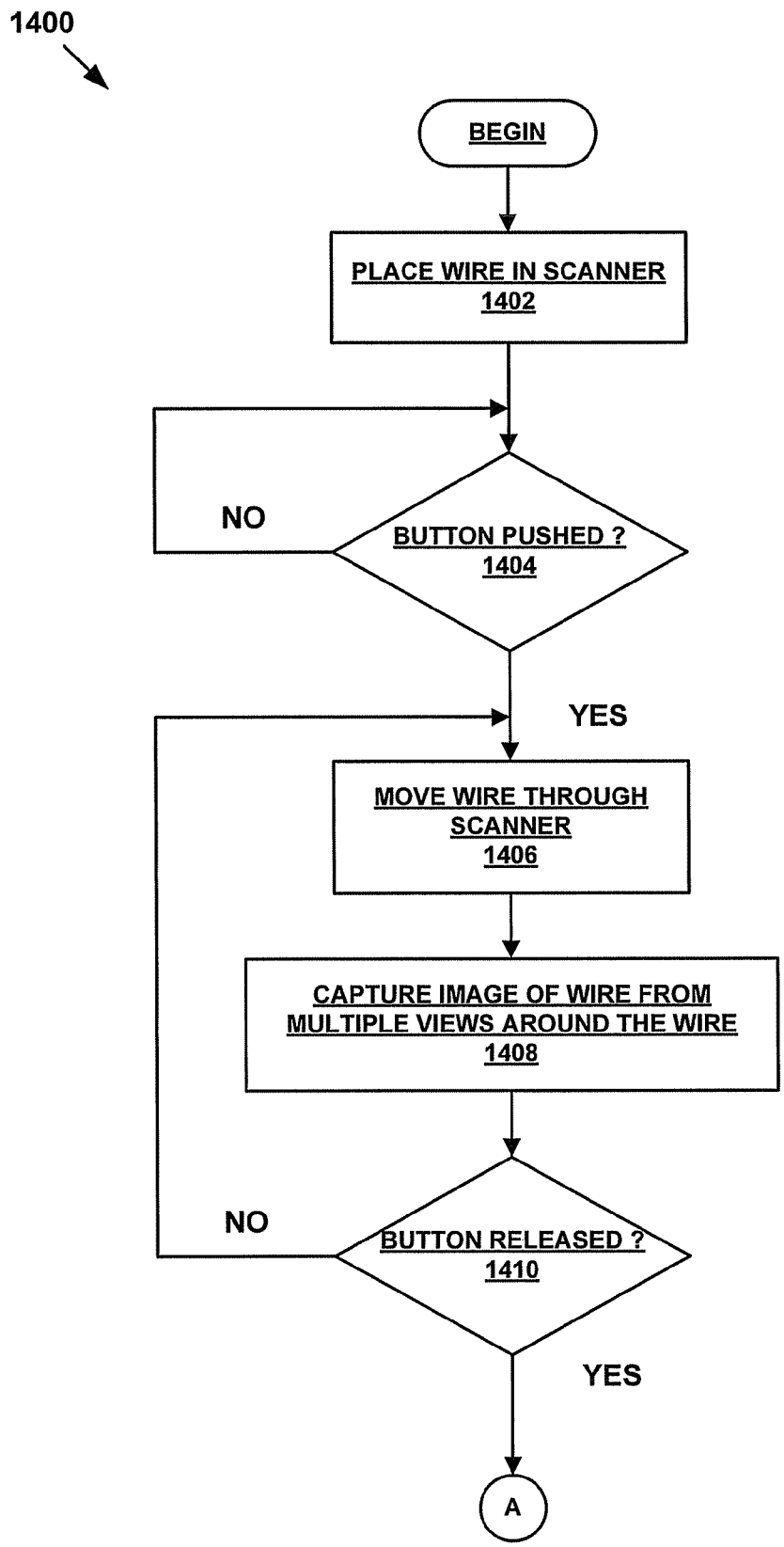
FIGS. 14a to 14e are a flow chart illustration of an exemplary embodiment of a method for reading characters on a wire.
Figure 14B:
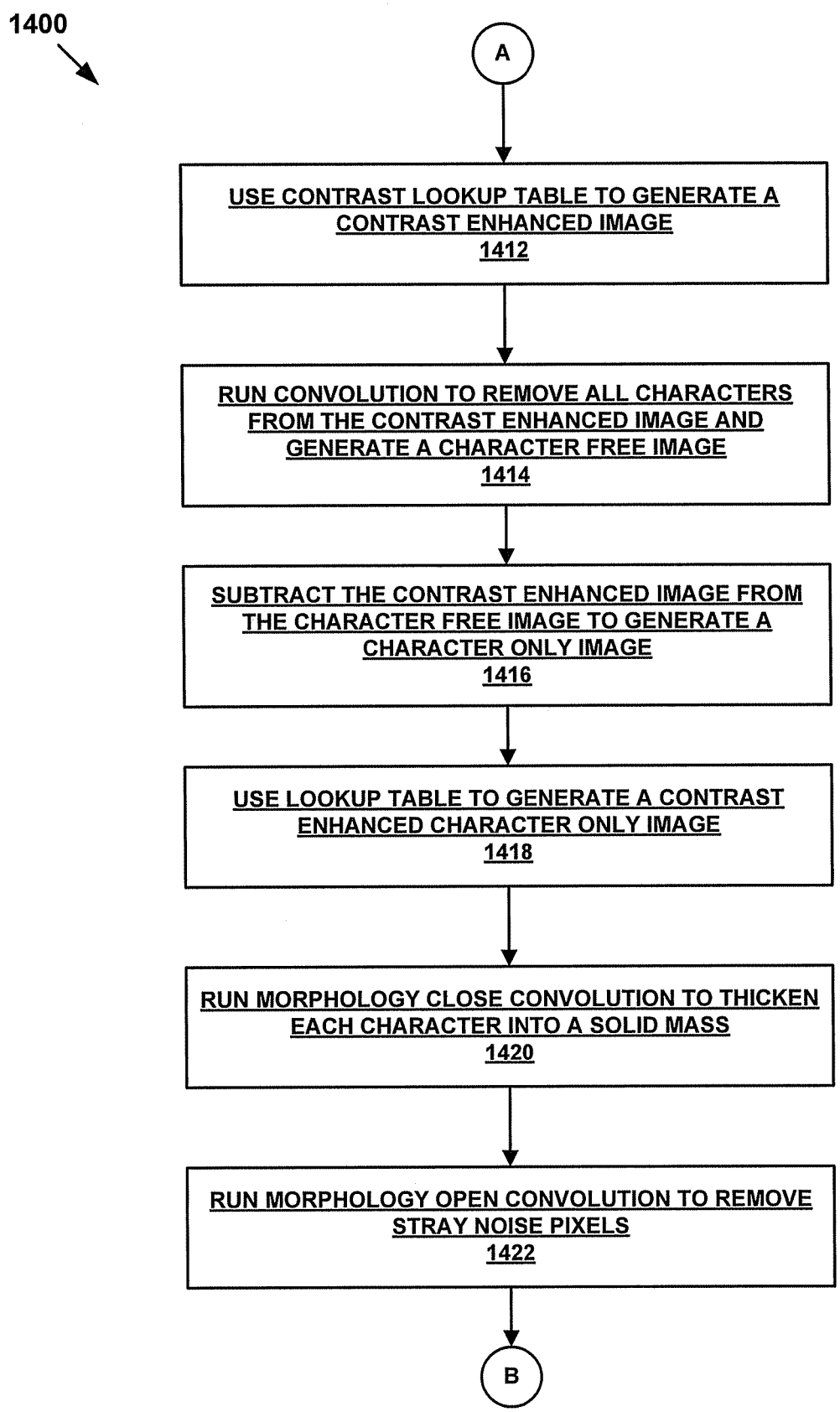
Figure 14C:
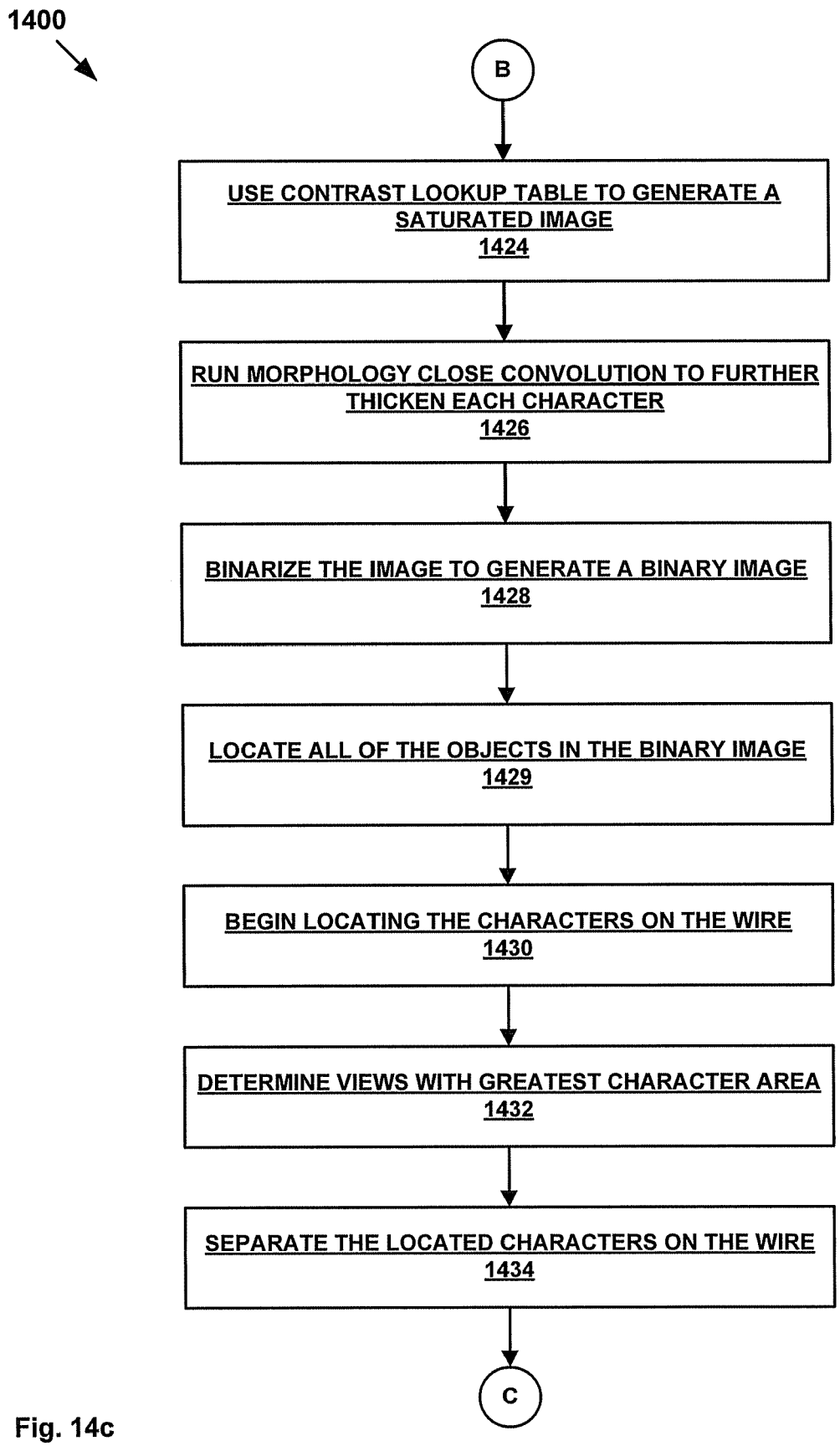
Figure 14D:
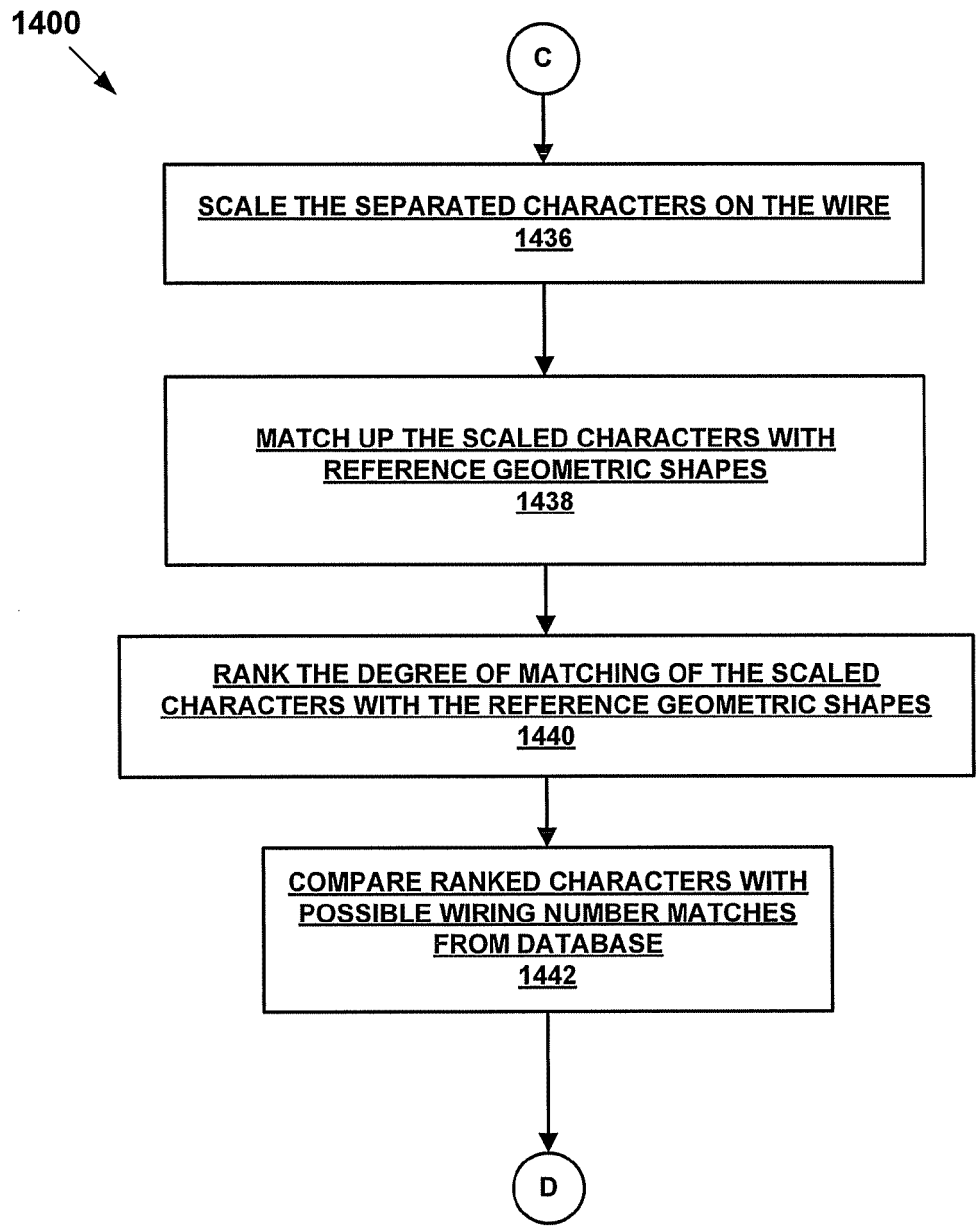
Figure 14E:
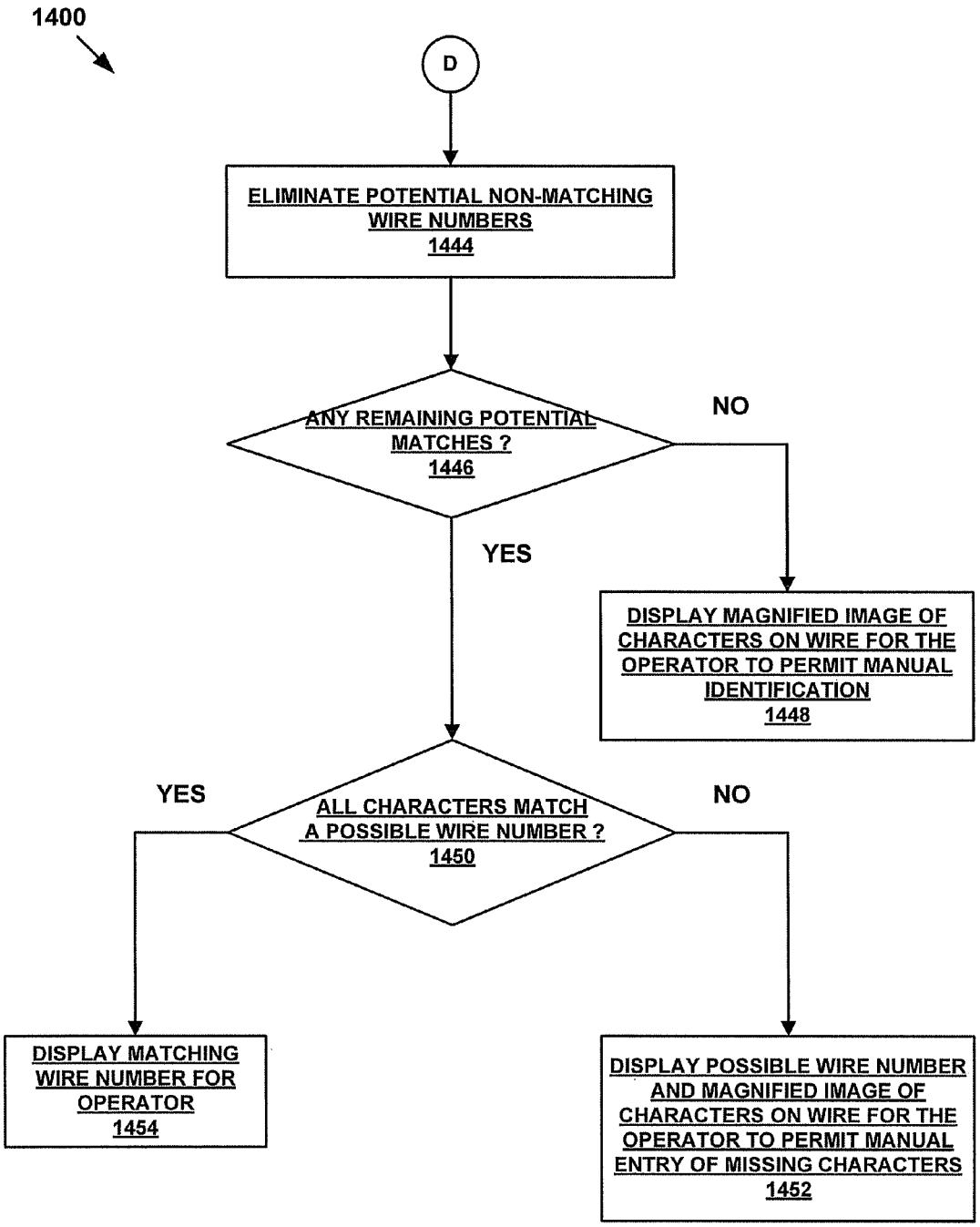

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring initially to FIGS. 1-13, an exemplary embodiment of system 100 for reading characters printed on wires includes a hand held scanning assembly 102 that includes a semi-circular scanning ring 104 having a rectangular cross-section that defines a plurality of circumferentially spaced apart radial passages 104a. In an exemplary embodiment, the scanning ring 104 includes an open end 104b that subtends of angle of approximately 45 degrees, and includes seven passages 104a spaced apart by approximately 45 degrees.

In an exemplary embodiment, the scanning ring 104 is positioned upon and supported by a circular shaped base member 106 that includes a pie-shaped opening 106a at one end that is aligned with the open end 104b of the scanning ring and includes a rounded bottom end 106b. In an exemplary embodiment, optical lenses 108 are positioned within and coupled to each of the radial passages 104a of the scanning ring 104.

In an exemplary embodiment, a semi-circular light ring 110 is positioned proximate the scanning ring 104 for illuminating the area proximate the scanning ring. In an exemplary embodiment, the light ring 110 includes an open end 110a that is aligned with the open end 104b of the scanning ring 104 and the open end 106a of the base member 106 and defines one or more radial passage 110b. An end of the base member 106 is coupled to a handle 112 that contains an LED light engine 114 and controller 116 that is operably coupled to the LED light engine. In an exemplary embodiment, the LED light engine 114 is a conventional LED light engine, commercially available from Luxon. In an exemplary embodiment, the controller 116 may, for example, be a programmable general purpose controller and/or an ASIC. In an exemplary embodiment, the controller 116 includes a LuxDrive controller, commercially available from Luxon.

An optical link 120 is coupled between the LED light engine 114 and the light ring 110 for conveying optical energy from the LED light engine to the light ring. In an exemplary embodiment, one end of the optical link 120 is received within and coupled to the radial passages 110b of the light ring. In this manner, the region within the scanning ring 104 and the light ring 110 may be illuminated. In an exemplary embodiment, the optical link 120 includes one or more conventional optical fibers to permit light energy to be conveyed from the LED light engine 114 to the light ring 110.

In an exemplary embodiment, a control button 122 is operably coupled to the handle 112 that in turn is operably coupled to the controller 116 for controlling the operation of the scanning assembly 102. In an exemplary embodiment, the scanning ring 104, the base member 106 and the LED light ring 110 are positioned within a housing 124 having an opening 124a that aligns with open end 104b of the scanning ring, the pie-shaped opening 106a of the base member, and the open end 110a of the LED light ring.

In an exemplary embodiment, the system 100 further includes a camera scanning assembly 124 that includes a camera 126 including a camera lens 128 that is operably coupled to a controller 130 for controlling the operation of the camera and camera lens. In an exemplary embodiment, the camera 126 and camera lens 128 are part of a line scan camera device, commercially available as a Dalsa Line Scan Camera from Dalsa. In an exemplary embodiment, the controller 130 may, for example, be a programmable general purpose controller and/or an ASIC that provides a frame grabber.

A support member 132 that defines spaced apart passages 134 is positioned proximate and in opposing relation to the camera lens 130. Optical lenses 136 are coupled to and positioned within each of the passages 134.

In an exemplary embodiment, first ends of optical fibers 138 are operably coupled to the outer radial ends of the lenses 108 and second ends of the optical fibers 138 are operably coupled to the ends of the lenses 136 positioned away from the camera lens 128. In an exemplary embodiment, the optical fibers 138 are provided as an optical fiber harness 140 that passes through the handle 112 of the assembly 102. In an exemplary embodiment, the lenses, 108 and/or 136, are provided by the ends of the optical fibers 138. Alternatively, the lenses, 108 and/or 136, may be separate and distinct from the ends of the optical fibers 138.

In an exemplary embodiment, the system 100 further includes a user interface 142 and a database 144 that are operably coupled to the controllers, 116 and 132, by a network 146. In an exemplary embodiment, the user interface is a conventional user interface that may, for example, include a keyboard and a display device. In an exemplary embodiment, the database 144 includes one or more records 144a representative of one or more permissible character strings for identifying wires.

Figure 15A:
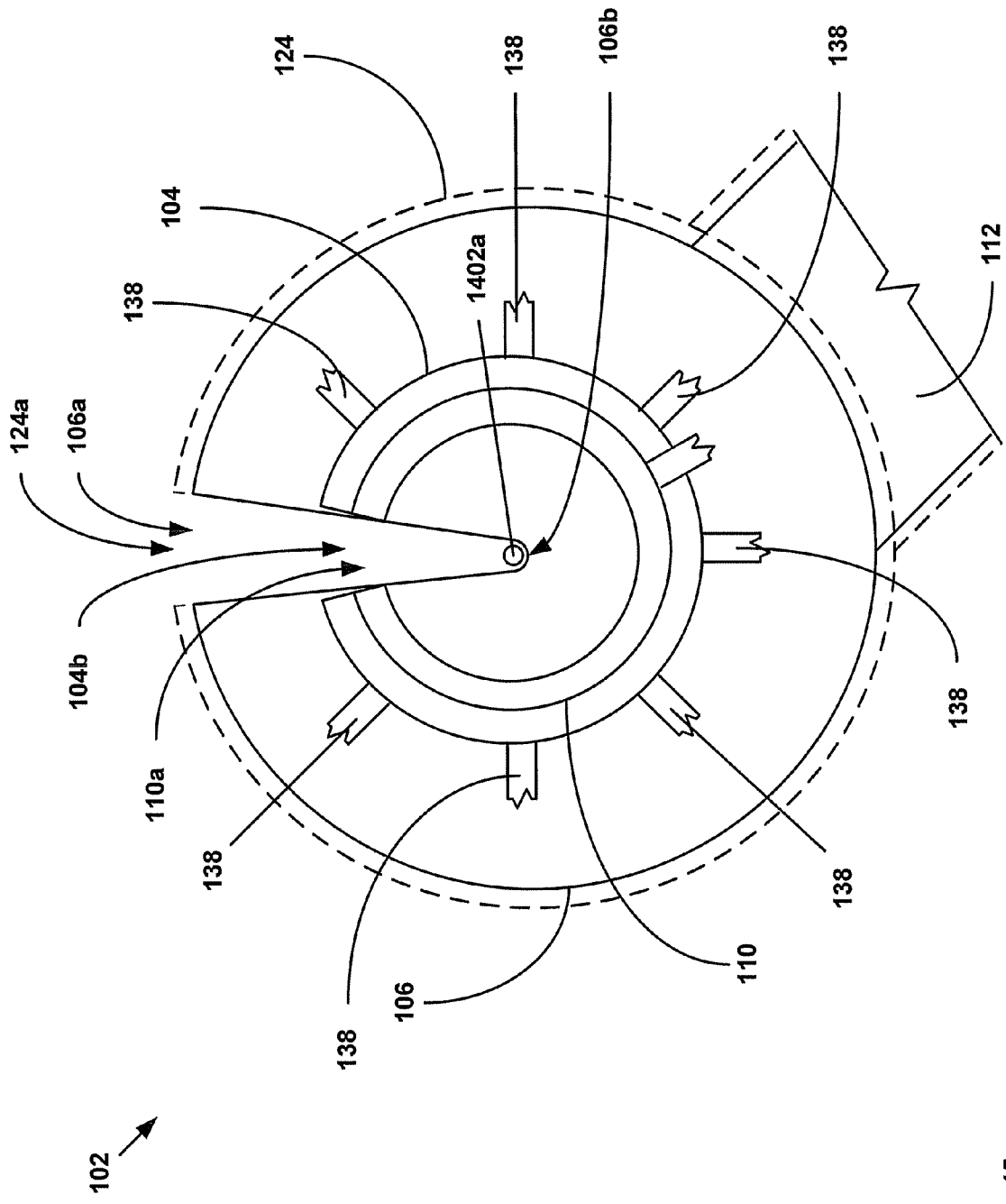
FIGS. 15a and 15b are fragmentary illustrations of the placement of a wire within the scanning ring of the optical scanning tool during the operation of the method of FIGS. 14a to 14e.
Figure 15B:
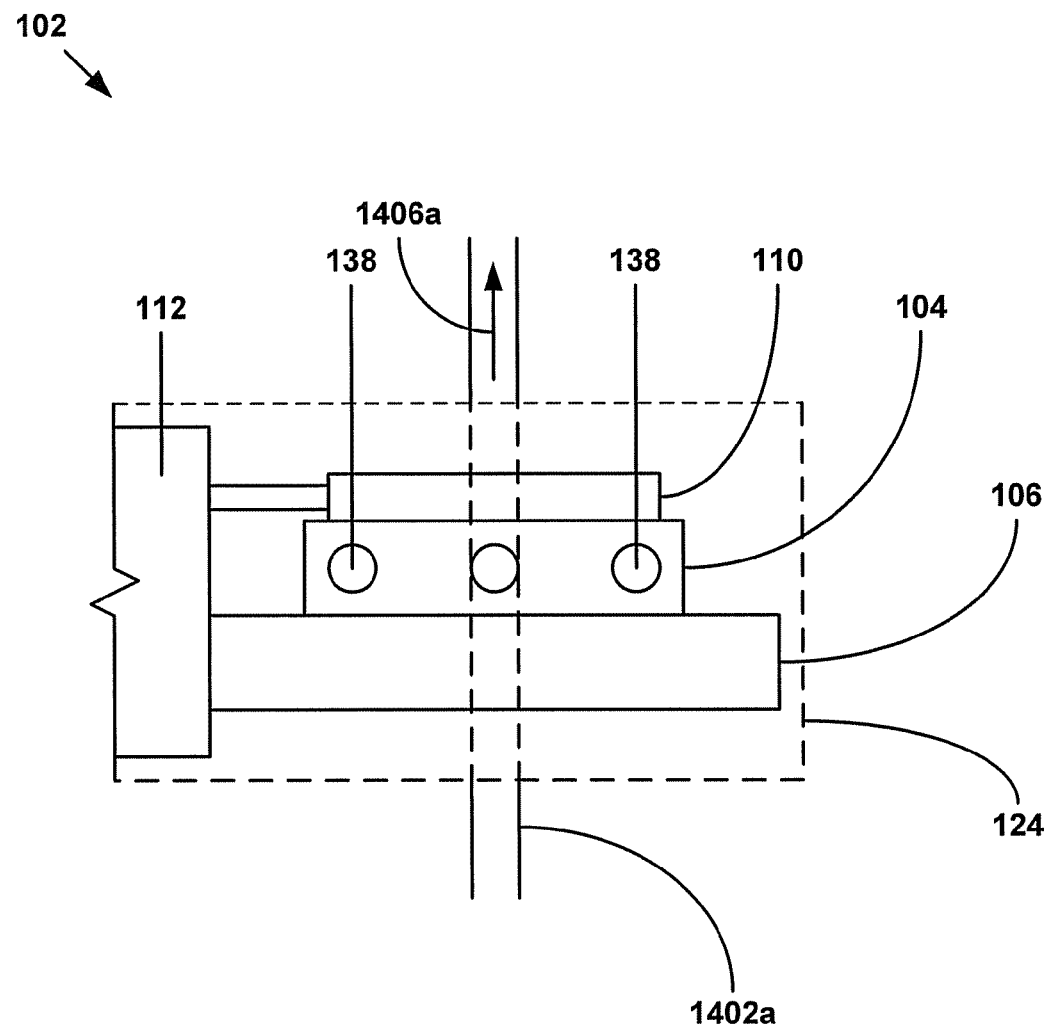

In an exemplary embodiment, as illustrated in FIGS. 14a to 14e, during the operation of the system 100, the system implements a method 1400 of identifying characters provided on a wire in which, in 1402, as illustrated in FIGS. 15a and 15b, a user places a wire 1402a within the assembly 102. In particular, in 1402, the user inserts the wire 1402a into the assembly 102 through the open ends, 104b, 106a, 110a, and 124a, of the scanning ring 104, the base member 106, the LED light ring 110, and the housing 124, respectively, until the wire is positioned within the rounded bottom end portion 106b of the base member.

The user may then depress the control button 122 of the assembly 102 in order to initiate an initial mode of operation of the system 100. If the control button 122 has been pushed in 1404, as illustrated in FIG. 15b, then the user moves the wire 1402a through the assembly 102 in a longitudinal direction 1406a in 1406. The system 100 then captures an image of the wire 1406a using the lenses 108 positioned within the scanning ring 104 while the user moves the wire 1402a through the assembly 102 in 1408. In an exemplary embodiment, the image of the wire 1406a captured using the lenses 108 is conveyed to the lenses 136 by the optical fibers 138 within the optical fiber harness 140. The images thereby displayed on the lenses 136 are then scanned and captured by the camera 128 and lens 130.

Figure 16:
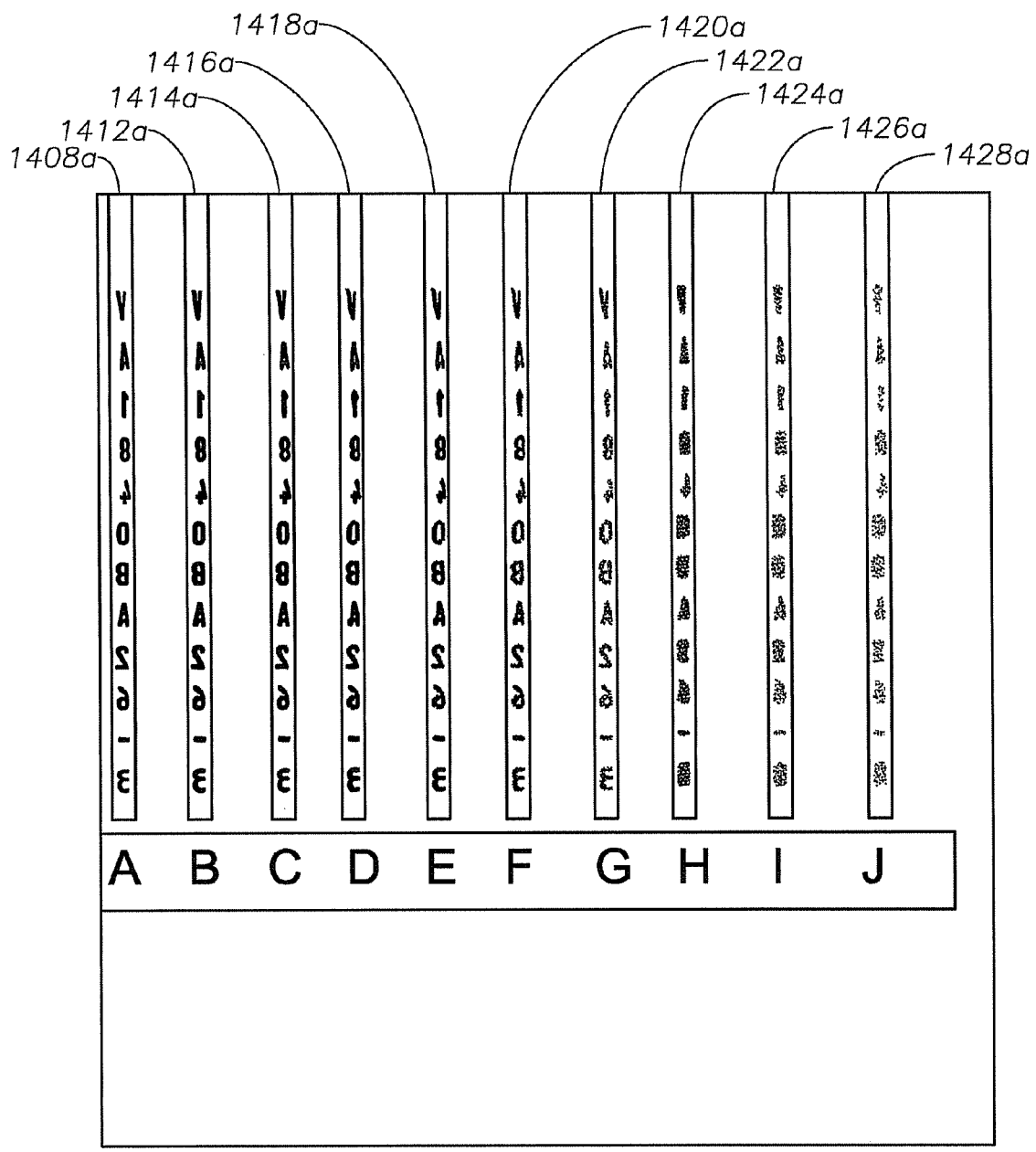
FIG. 16 is an illustration of the processing of images during the operation of the method of FIGS. 14a to 14e.

In an exemplary embodiment, as illustrated in FIG. 16, in 1408, the system 100 captures an image 1408a while the user moves the wire 1402a through the assembly 102.

If the control button 122 of the assembly 102 has been released in 1410, then a subsequent mode of operation is then initiated in which, in 1412, 1414, 1416, 1418, 1420, 1422, 1424, 1426, 1428 and 1429, the image 1408a is pre-processed.

In 1412, as illustrated in FIG. 16, the system 100 then uses a contrast look up table ("LUT") to generate a contrast enhanced image 1412a from the image 1408a.

In 1414, as illustrated in FIG. 16, the system 100 then runs a convolution on the contrast enhanced image 1412a to remove all characters from the contrast enhanced image and thereby generate a character free image 1414a.

In 1416, as illustrated in FIG. 16, the system 100 then subtracts the contrast enhanced image 1412a from the character free image 1414a to generate a character only image 1416a.

In 1418, as illustrated in FIG. 16, the system 100 then uses a contrast LUT to generate a contrast enhanced image 1418a from the character only image 1416a.

In 1420, as illustrated in FIG. 16, the system 100 then runs a closed morphology convolution on the contrast enhanced image 1418a to generate an image 1420a with thickened characters.

In 1422, as illustrated in FIG. 16, the system 100 then runs an open morphology convolution on the image 1420a with thickened characters to remove stray noise pixels and generate an image 1422a.

In 1424, as illustrated in FIG. 16, the system 100 then uses a contrast LUT to generate a saturated image 1424a from the image 1422a.

In 1426, as illustrated in FIG. 16, the system 100 then uses a contrast LUT to generate an image 1426a with thickened characters from the saturated image 1424a.

In 1428, as illustrated in FIG. 16, the system 100 then binarizes the image 1426a with thickened characters to generate a binary image 1428a.

In 1429, system 100 then processes the binary image 1428a to determine all of the objects in the binary image. In an exemplary embodiment, the determination of all of the objects in the binary image 1428a in 1429 is provided using a conventional blob analysis and/or a contour locating algorithm.

Once the system 100 has completed the pre-processing in 1412, 1414, 1416, 1418, 1420, 1422, 1424, 1426, 1428 and 1429, the system, in 1430, then processes the binary image 1428a to begin locating characters on the wire 1402a. In an exemplary embodiment, in 1430, the system 100 begins locating characters on the wire 1402a by using information obtained from the analysis in 1429 such as, for example, the location, width, and height of each determined object. In an exemplary embodiment, in 1430, the system 100 filters out noise and other extraneous visual information to determine the location of the objects on the wire 1402a.

In 1432, the system 100 then determines the views of the wire 1402a provided by the circumferentially spaced apart lenses 108 that provide the greatest character viewing area. In an exemplary embodiment, in 1432, the system 100 determines the views of the wire 1402a provided by the lenses 108 providing greatest character viewing area by determining the view having the greatest character surface area. For example, in 1432, the system 100 may combine all of the viewable pixels together and determine their sum total.

In 1434, the system 100 then separates the located characters on the wire 1402a. In an exemplary embodiment, in 1434, the system 100 separates the located characters on the wire 1402a by using information obtained from the analysis in 1429 such as, for example, the location, width, and height of each determined object.

In 1436, the system 100 then scales the separated characters on the wire 1402a. In an exemplary embodiment, in 1436, the system 100 scales the separated characters on the wire 1402*a* using one or more conventional algorithms for scaling visual images.

In 1438, the system 100 then matches up the scaled characters on the wire 1402*a* with reference geometric shapes. In an exemplary embodiment, in 1438, the system 100 matches up the scaled characters on the wire 1402*a* with reference geometric shapes in a conventional manner using, for example, a conventional matching algorithm such as the Geometric Modeling matching algorithm product, commercially available from Matrox Corporation.

In 1440, the system 100 then ranks the degree to which the scaled characters on the wire 1402*a* match up with the reference geometric shapes. In an exemplary embodiment, in 1440, the system 100 ranks the degree to which the scaled characters on the wire 1402*a* match up with the reference geometric shapes in a conventional manner using, for example, a conventional geometric matching algorithm such as the Geometric Modeling matching algorithm product, commercially available from Matrox Corporation.

In 1442, the system 100 then compares the ranked characters on the wire 1402*a* with possible wiring identification numbers 144*a* provided in the database 144. In an exemplary embodiment, in 1442, the system 100 compares the ranked characters on the wire 1402*a* with possible wiring identification numbers 144*a* provided in the database 1442 in a conventional manner using, for example, a conventional comparison algorithm such as the Geometric Modeling matching algorithm product, commercially available from Matrox Corporation.

In 1444, the system 100 then eliminates potential non-matching wiring identification numbers 144*a*. In an exemplary embodiment, in 1444, the system 100 eliminates potential non-matching wiring identification numbers 144*a* in a conventional manner using, for example, a conventional matching algorithm such as the Geometric Modeling matching algorithm product, commercially available from Matrox Corporation.

In 1446, the system 100 then determines if there are any remaining potential matching wiring identification numbers 144*a*. In an exemplary embodiment, in 1446, the system 100 continues processing until there is only one possible matching wiring identification number 144*a*.

Figure 17:
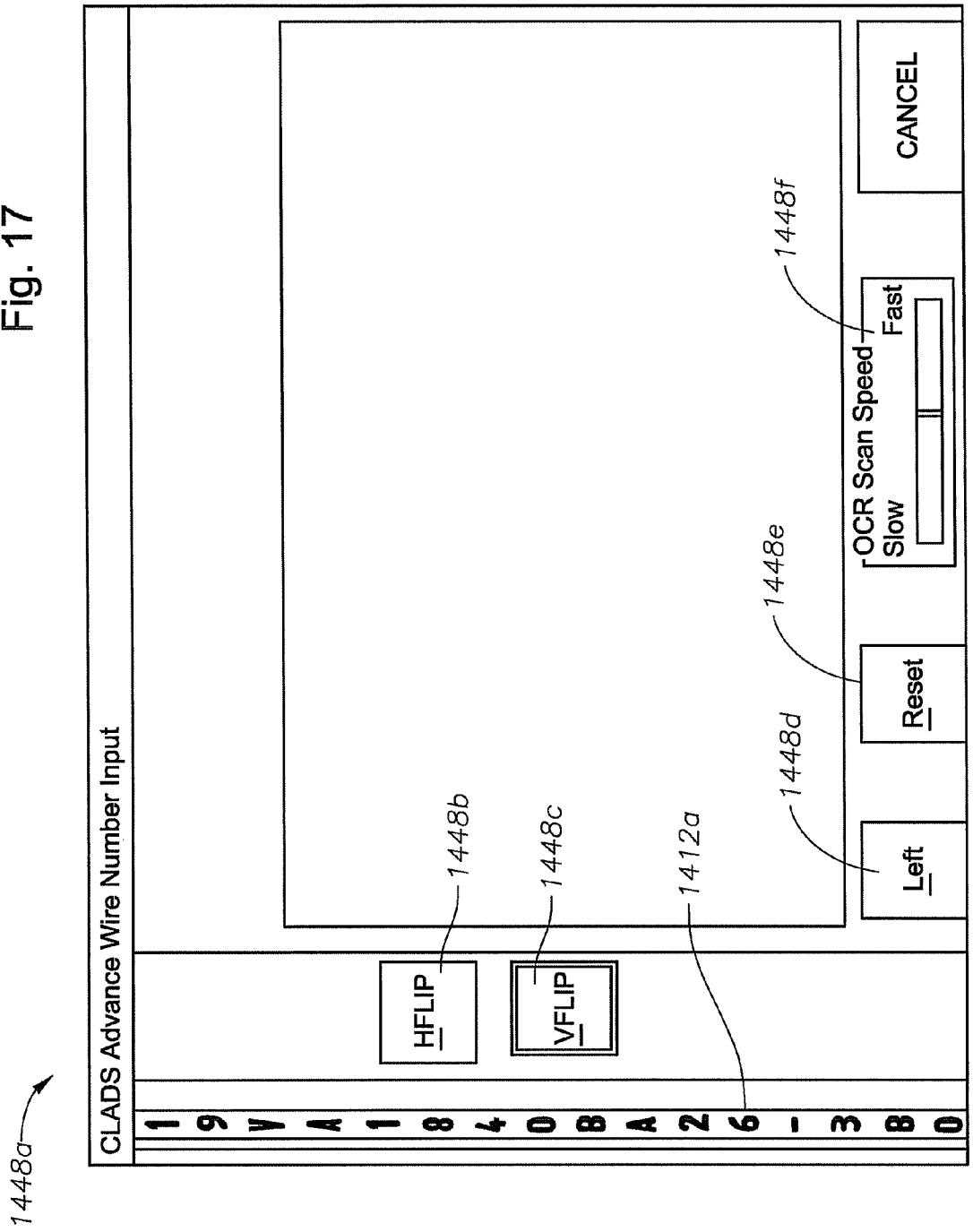
FIG. 17 is an illustration of a user interface generated during the operation of the method of FIGS. 14a to 14e.

In 1446, if the system 100 determines that there are no wiring identification numbers 144*a* in the database 144 that could match the identification number on the wire 1402*a*, then, as illustrated in FIG. 17, the image 1412*a* is displayed on the user interface 142 as a graphical user interface ("GUI") 1448*a*. In an exemplary embodiment, in 1448, the image 1412*a* is magnified on the GUI 1448*a* in order to permit the user to manually determine the identification provided on the wire 1402*a* and then manually enter the identified identification number into the database 144 using the user interface 142.

In an exemplary embodiment, the GUI 1448*a* further includes display controls, 1448*b* and 1448*c*, that permit the user to flip the image 1412*a* either horizontally or vertically, respectively. In an exemplary embodiment, the GUI 1448*a* further includes display controls, 1448*d* and 1448*e*, that permit the user to move the image 1412*a* to the left or reset the image, respectively. In an exemplary embodiment, the GUI 1448*a* further includes a scanning indication 1448*f* that indicates to the user the speed with which the system 100 scans the wire 1402*a*.

In 1446, if the system 100 determines that there are wiring identification numbers 144*a* in the database 144 that could match the identification number on the wire 1402*a*, then the system then determines if the identification number on the wire matches a single of the wiring identification numbers in the database in 1450.

Figure 18:
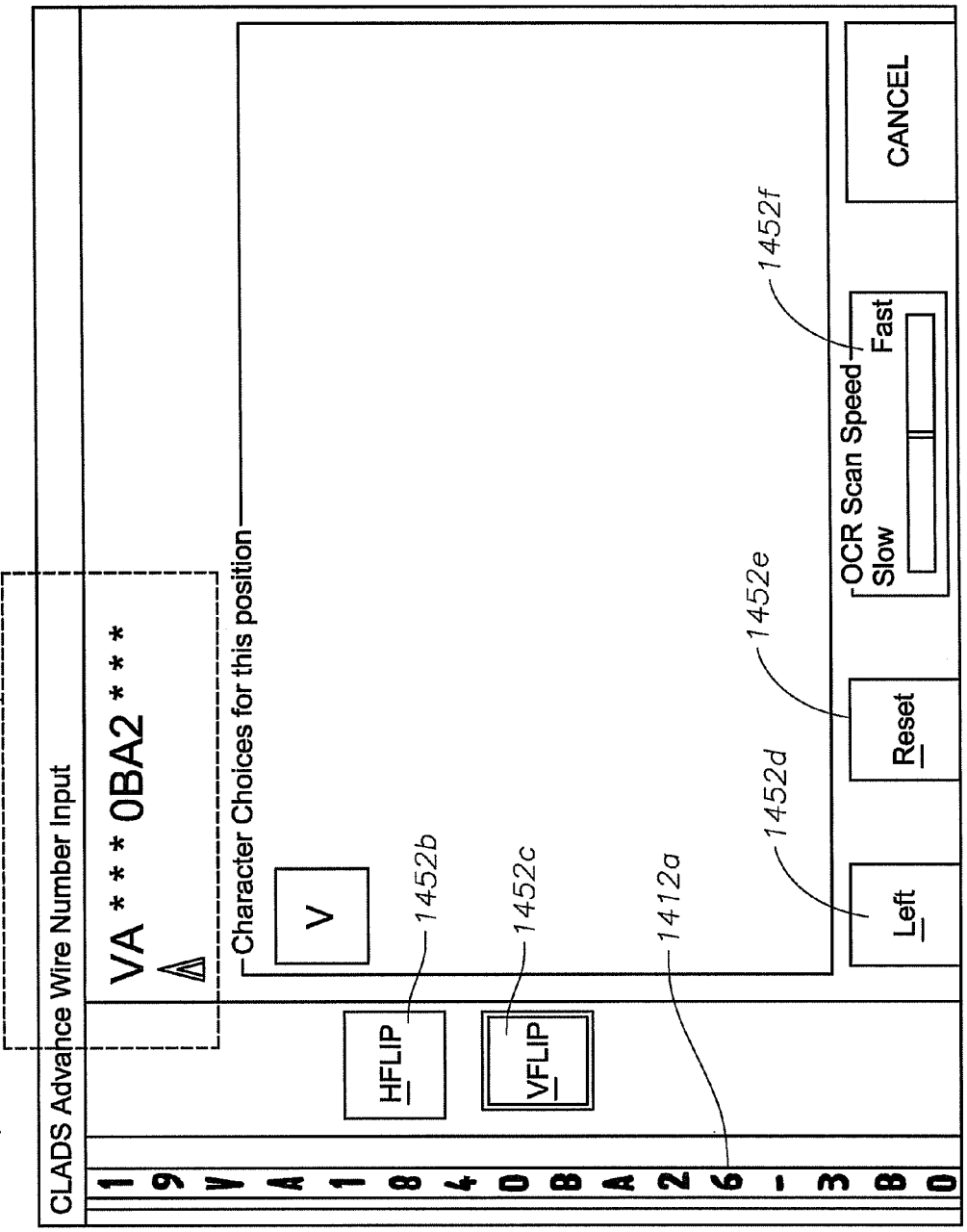
FIG. 18 is an illustration of a user interface generated during the operation of the method of FIGS. 14a to 14e.

In 1450, if the system 100 determines that the identification number on the wire 1402*a* could match a plurality of the wiring identification numbers 144*a* in the database 144, then, as illustrated in FIG. 18, the image 1412*a* is displayed on the user interface 142 as a graphical user interface ("GUI") 1452*a*. In an exemplary embodiment, in 1452, the image 1412*a* is magnified on the GUI 1452*a* in order to permit the user to manually determine the identification provided on the wire 1402*a* and then manually enter the missing portions of the identified identification number into the database 144 using the user interface 142.

In an exemplary embodiment, the GUI 1452*a* further includes display controls, 1452*b* and 1452*c*, that permit the user to flip the image 1412*a* either horizontally or vertically, respectively. In an exemplary embodiment, the GUI 14528*a* further includes display controls, 1452*d* and 1452*e*, that permit the user to move the image 1412*a* to the left or reset the image, respectively. In an exemplary embodiment, the GUI 1452*a* further includes a scanning control 1452*f* that permits the user to adjust the speed with which the system 100 scans the wire 1402*a*. In an exemplary embodiment, the GUI 1452*a* further includes a display 1452*g* of the characters on the wire 1402*a* that match up with at least portions of potential wire identifications 144*a* in the database 144. In an exemplary embodiment, the display 1452*g* indicates the characters on the wire 1402*a* that match portions of potential wire identifications 144*a* in the database 144 by displaying those value and non-matching portions are indicated with an asterisk.

In 1450, if the system 100 determines that the identification number on the wire 1402*a* only matches one of the wiring identification numbers 144*a* in the database 144, then, in 1454, the system displays the matching identification number on the user interface 142 for the user.

It is understood that variations may be made in the above without departing from the scope of the invention. For example, the system 100 may include any number of spaced apart viewing lenses 108. In addition, the angle subtended by open end 104*b* of the scanning ring 104 may vary to provide more or less of a viewing angle by the spaced apart viewing lenses 108. For example, any type of scanning camera may be used for the camera 128 in the system 100. In addition, the system 100 may also capture the image 1408*a* of the wire 1402*a* while the user moves the assembly 102 relative to the wire. For example, the teachings of the present exemplary embodiments may be applied to the identification of images on any object. Furthermore, the elements of the present exemplary embodiments may be combined in a single device. In addition, the implementation of the methodologies of the present exemplary embodiments may be provided by local or non-local controllers and/or controllers that are distributed within a network. For example, one or more of the steps of the method 1400 may be combined, in whole or in part, with one or more other steps of the method. In addition, the GUI 1448*a* may include a scanning control that permits the user to adjust the speed with which the system 100 scans the wire 1402*a*. Further, spatial references are for the purpose of illustration only and do not limit the specific orientation or location of the structure described above. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A system for scanning a wire to determine the characters provided on the wire, comprising:
    a scanning device for scanning the wire from a plurality of scanning locations; an image processing device operably coupled to the scanning device for determining the characters provided on the wire;
    wherein the scanning device comprises:
    a plurality of scanning lenses adapted to be positioned around the wire;
    an illumination device operably coupled to the scanning lenses for illuminating the wire; and
    a light engine operably coupled to the illumination device.

2. The system of claim 1, wherein the scanning device comprises:
    a plurality of optical fibers coupled to the scanning lenses.

3. The system of claim 1, wherein the scanning device comprises:
    a control button for controlling the operation of the scanning device operably coupled to the image processing device.

4. The system of claim 1, wherein the scanning device comprises a housing defining an opening for receiving the wire.

5. The system of claim 4, wherein the scanning device comprises a semi-circular scanning ring positioned within the housing for supporting the scanning locations.

6. The system of claim 4, wherein the illumination device is positioned within the housing proximate the scanning locations for illuminating the wire.

7. The system of claim 6, wherein the light engine is positioned within the housing.

8. The system of claim 1, wherein the image processing device comprises:
    a camera; and
    a controller operably coupled to the camera.

9. The system of claim 8, wherein the image processing device comprises:
    a plurality of viewing lenses operably coupled to viewing locations positioned proximate the camera.

10. The system of claim 9, wherein the image processing device comprises:
    a plurality of optical fibers operably coupled to the viewing lenses.

11. The system of claim 8, wherein the image processing device comprises:
    a database operably coupled to the controller that comprises one or more records representative of possible character strings that could be on the wire.

12. The system of claim 11, wherein the controller is adapted to process an image of the wire and determine if the characters on the wire match any of the records representative of possible character strings that could be on the wire.

* * * * *